July 13, 1926.  
W. ROBERTS  
1,592,581  
UNIVERSAL JOINT  
Filed Feb. 15, 1922   2 Sheets-Sheet 1

William Roberts, Inventor

By F. E. Shannon

Attorney

July 13, 1926.

W. ROBERTS

UNIVERSAL JOINT

Filed Feb. 15, 1922

Inventor
William Roberts
By F. E. Shannon
Attorney

Patented July 13, 1926.

1,592,581

UNITED STATES PATENT OFFICE.

WILLIAM ROBERTS, OF AKRON, OHIO.

UNIVERSAL JOINT.

Application filed February 15, 1922. Serial No. 536,633.

My invention relates to improvements in universal joints such as are commonly employed in connection with driving shafts for power transmission.

Objects of the invention are to provide a strong, durable, universal joint of simple, comparatively inexpensive construction, which will permit no loss of motion and will be practically noiseless in operation.

A further object is to provide a practical joint which will permit free universal movement of the shaft parts and which in addition will permit a longitudinal movement of one of said parts relative to the other.

The above and additional objects are accomplished by the novel construction, combination and arrangement of parts hereinafter described and illustrated in the accompanying drawing, wherein I have shown a preferred embodiment of the invention, it being understood that the invention is capable of various adaptations and that changes and modifications may be made or substitutions resorted to which come within the scope of the claims hereunto appended.

In the drawings in which similar numerals of reference have been employed to designate like parts as the same may occur in the several views, and in which:—

Figure 1:
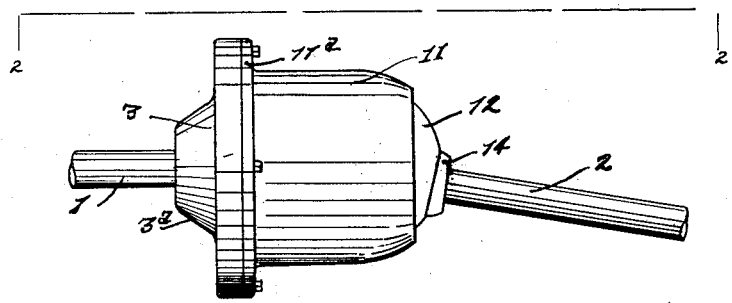
Figure 1 is a side elevation of my improved joint showing portions of the shaft parts operatively connected thereto.
Figure 2:
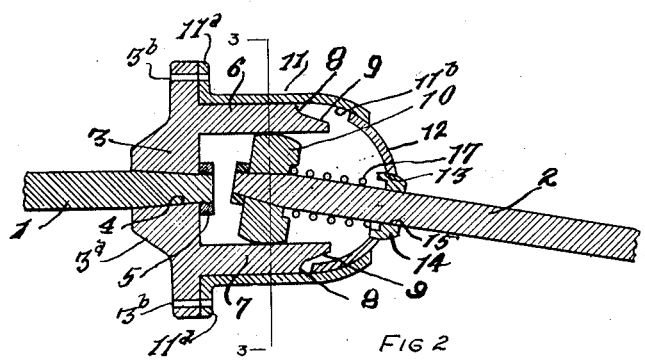
Figure 2 is a central, vertical, sectional view of same taken as indicated by the lines 2—2 of Figure 1.

Turning now to a detailed description of the invention with reference to the accompanying drawings, the numeral 1 denotes a driving shaft which is adapted to be operatively attached to a source of power and the numeral 2 denotes a driven shaft which is operatively connected to the shaft 1 by my improved joint. The adjacent ends of the shafts 1 and 2 are tapered and each is exteriorly threaded so that a nut may be secured thereon. The numeral 3 denotes a circular member which is provided on its outer face with a centrally positioned outwardly protruding, frusto-conical boss $3^a$. A bore 4 which is adapted to receive the tapered end of the shaft 1 extends coaxially through the said member 3 and through the boss $3^a$. The shaft 1 is positioned in said bore and a nut 5 is threaded on the inner end thereof as shown in Figure 2.

The numerals 6 and 7 denote forks which project from the inner face of the member 3 at points diametrically opposite the center thereof and in parallel relation to the axis of the member 3 and in spaced relation to the circumferential edge thereof. The forks 6 and 7 comprise oppositely arranged segments of a cylinder formed by parallel planes positioned equi-distant from the axis thereof. The outer face of each of the forks 6 and 7 are thus provided with a cylindrical surface and the inner faces thereof with parallelly disposed plane surfaces. Each fork 6 and 7 is provided adjacent the outer end thereof with an offset shoulder 8 and each is provided adjacent its outwardly projecting end with a surface which corresponds to the surface of a cone coaxially arranged in respect to the member 3.

Figure 3:
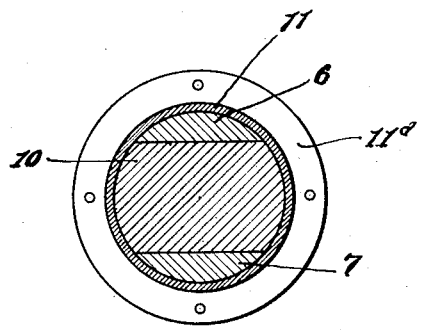
Figure 3 is a transverse, sectional view of same taken approximately on line 3—3 of Figure 2.
Figure 4:
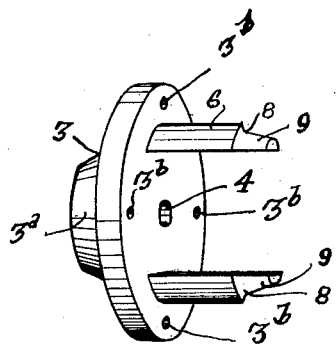
Figure 4 is a perspective view of the driving member employed in my improved joint.

The numeral 11 denotes a cylindrical casing which is provided at its base with an annular flange $11^a$ of substantially the same diameter as the member 3 to which it is adapted to be secured by means of bolts extending through the bores $3^b$ in said member 3 and through suitable bores in said flange. The casing 11 is adapted to snugly fit the cylindrical surface of the forks 6 and 7 and is positioned on said forks as shown in Figures 2 and 3. The walls of the casing 11 converge at the outer end thereof along lines conforming to the surface of a sphere and the interior face of said casing is thus provided, adjacent its outer end with a surface which conforms to the interior surface of a sphere.

The numeral 10 denotes a head which is provided with a centrally positioned bore adapted to receive the tapered end of the shaft 2 which is keyed thereto and is secured therein by means of a nut or other suitable fastening means. The lateral faces 10$^a$ and 10$^b$ of the head 10 are provided with surfaces which correspond to the surface of a cylinder having an axis which passes through the axis of the head 10 at a right angle thereto and which has a diameter approximately equal to the distance between the forks 6 and 7 in the member 3.

Figures 5, 6:
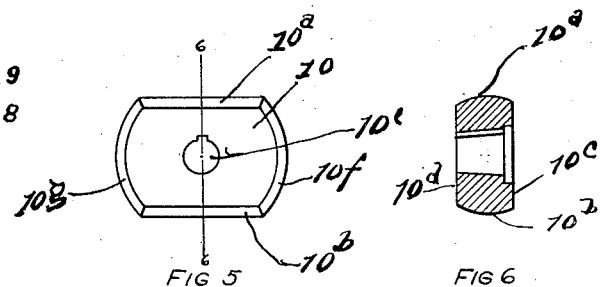
Figure 5 is a front view of the driven member or shaft head adapted to be engaged by said driving member.
Figure 6 is a sectional view of same taken on line 6—6 of Figure 5.
Figures 7, 8:
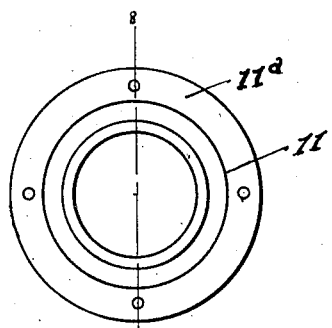
Figure 7 is a plan view of the casing employed in carrying out this invention.
Figure 8 is a central, vertical, sectional view of same taken on line 8—8 of Figure 7.

As will be noted by a careful examination of Figure 6, one axial face 10$^c$ of the head 10 is of greater area than the other axial face 10$^d$ thereof and the axis of said cylindrical surfaces 10$^a$ and 10$^b$ is disposed in close spaced relation to the face 10$^c$. The ends 10$^g$ and 10$^f$ of the head 10 are provided with a surface conforming to the surface of a sphere having a diameter equal to the interior diameter of the casing 11. The cap 12 comprises a portion of a hollow sphere having an exterior diameter equal to the interior diameter of the surface 11$^b$. The cap is relatively larger at its base than the opening in the free end of the casing. The cap 12 is provided with a centrally positioned opening 13 and the walls of the opening 13 conform to the interior surface of a hollow sphere having its center well within the cap so that the cap may be held in an outward position by the member 14 hereinafter described.

Figures 11, 12:
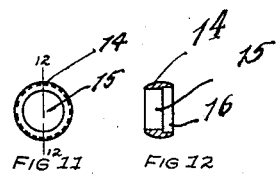
Figure 11 is a plan view of a bearing member adapted to hold the said cap in an outward position.
Figure 12 is a central, sectional view of same taken as indicated by the line 12—12 of Figure 11.
Figures 9, 10:
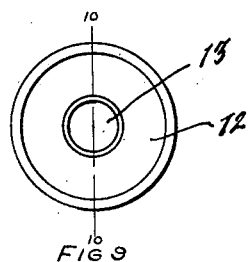
Figure 9 is a plan view of a cap used with my improved joint.
Figure 10 is a central, sectional view of same taken on line 10—10 of Figure 9.

In Figures 11 and 12, I have shown an annular member 14 having a peripheral surface conforming to the surface of a sphere adapted to seat in the bore 13 in the cap 12. The member 14 is provided with a centrally positioned bore 15 which extends therethrough and is adapted to receive the shaft 2. The bore 15 is enlarged adjacent one end thereof to provide an offset cavity and the bore in the head 10 is also counterbored to provide an annular cavity adapted to receive one end of the coil spring 17 which is mounted on said shaft 2. The member 14 is slidably mounted on said shaft 2 in spaced relation to the head 10 and with the annular cavity 16 presented to said head for the reception of the other end of the spring 17 which is thus arranged to hold the member 14 in said bore 13 and maintain the cap 12 in contact with the surface 11$^b$ of said casing 11.

While the shaft 1 has been referred to as the driving shaft and the shaft 2 as the driven shaft, it is to be understood that the said shafts have been so designated for convenience of description and that in using my improved joint, the shaft 2 may be connected to the source of power in which case the shaft 1 is the driven shaft.

Having thus described my invention and described the same in detail, what I claim as new and desire to secure by Letters Patent is:—

1. A metallic boot or housing for universal joints, comprising a first member adapted to be connected with one member of the joint, a second member having at one end a parti-globular universal contact joint with the outer end of the first member and at its other end a parti-globular universal contact joint with a part connected with the other member of the joint.

2. In a metallic boot or housing for universal joints as set forth in claim 1, the second parti-globular contact joint comprising a washer having a slidably parti-globular contact with the outer end of the second member of the casing and means for yieldably pressing the said washer to maintain such parti-globular contact while permitting relative lateral oscillatory play.

In testimony whereof I have hereunto set my hand.

WILLIAM ROBERTS.